Figure 1:
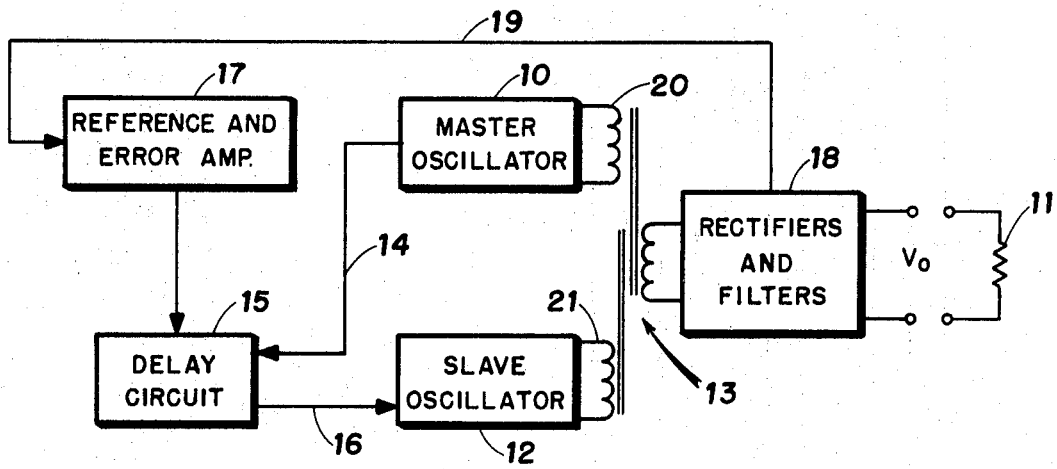

United States Patent [11] 3,571,692

[72] Inventor Carl F. Andren
 St. Petersburg, Fla.
[21] Appl. No. 838,140
[22] Filed July 1, 1969
[45] Patented Mar. 23, 1971
[73] Assignee The United States of America as represented by the Secretary of the Navy

[54] STEP WIDTH REGULATED DC/DC CONVERTER
9 Claims, 5 Drawing Figs.
[52] U.S. Cl. .................................... 321/18, 321/27
[51] Int. Cl. .................................... H02m 7/48
[50] Field of Search .................................... 321/18, 27, 27 (MS)

[56] References Cited
UNITED STATES PATENTS

| | | | |
|---|---|---|---|
| 2,990,517 | 6/1961 | Grieg | (321)/(27MS) |
| 3,031,629 | 4/1962 | Kadri | (321)/(27MS) |
| 3,205,424 | 9/1965 | Bates | 321/18 |
| 3,317,812 | 5/1967 | Mesenhimer | (321)/(27MS) |
| 3,343,062 | 9/1967 | Mesenhimer | (321)/(27MS) |
| 3,381,205 | 4/1968 | Howell et al. | 321/18 |
| 3,473,039 | 10/1969 | Fegley | 321/2X |
| 3,309,600 | 3/1967 | Wellford | (321)/(27MS) |

Primary Examiner—William M. Shoop, Jr.
Attorneys—R. S. Sciascia, J. A. Cooke and John O. Tresansky ABSTRACT: A feedback regulated DC/DC converter is disclosed. More particularly, an unregulated master oscillator feeds square waves into one core of a dual-core transformer, and a slave oscillator (whose output amplitude is a predetermined fraction of the master oscillator's output amplitude) also feeds square waves into the other core of the transformer. A sample of the transformer output after it has been rectified and filtered is compared against a reference value and the difference between the output value and the reference value produces an error current which is fed into a delay circuit. The delay circuit will then synchronously adjust the output phase of the slave oscillator. Thus, the average voltage appearing across the secondary of the dual-core transformer is varied by adjusting the relative phase between the master and the slave oscillator. Since the slave oscillator operates at only a small percent of the master oscillator's output, step-width modulation, rather than the standard pulse width modulation, results.

INVENTOR
CARL F. ANDREN

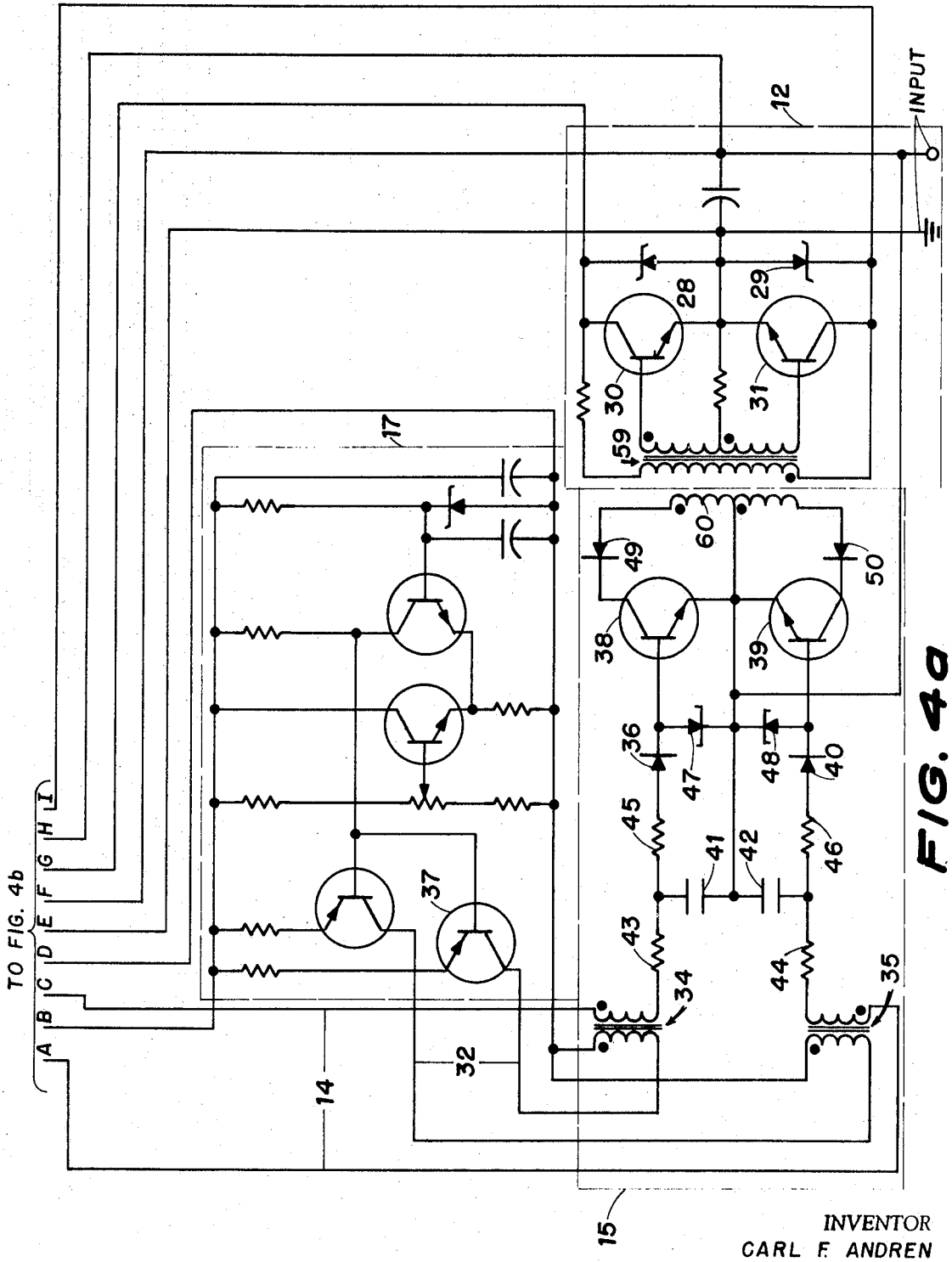

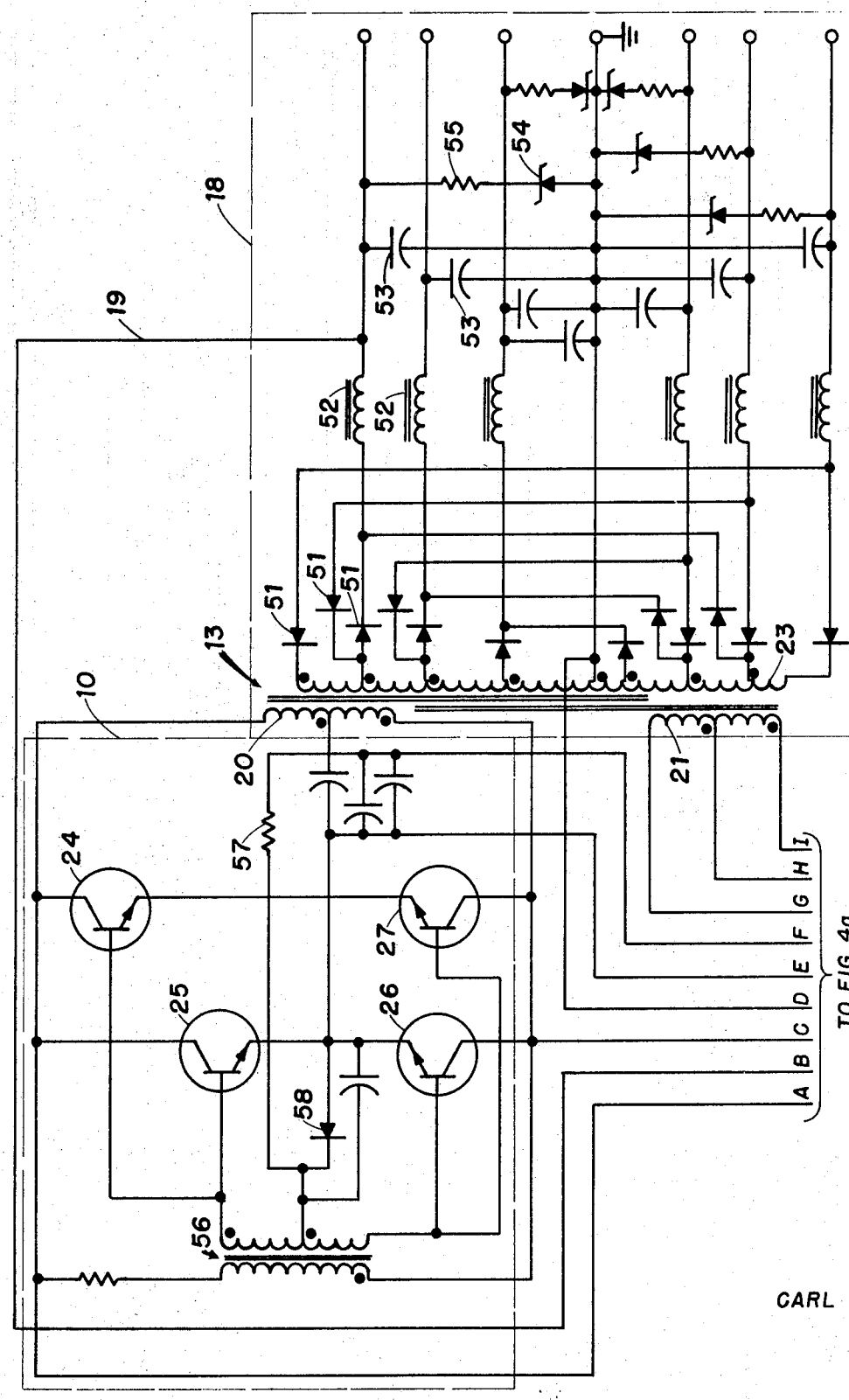

STEP WIDTH REGULATED DC/DC CONVERTER

BACKGROUND OF THE INVENTION

1. Field of the Invention

The present invention relates generally to a regulated DC/DC converter and more particularly to a new and improved DC/DC converter which requires only slight waveshape smoothing in the filter stage, displays an improved transient load performance, and operates with a greatly improved efficiency.

2. Description of the Prior Art

The typical nonregulated DC/DC converter disclosed in the prior art contains an oscillator which converts the input DC power to a square wave function, a transformer to step the voltage up or down, and rectifiers to return the power to DC. Two commonly used circuits in such prior art DC/DC converters are comprised of a single oscillator which uses two transformers in either a voltage or current feedback arrangement. In this prior art voltage feedback arrangement, the oscillator is made short circuit proof by utilizing a transistor base current which is proportional to the supply voltage. However, as a penalty for this short circuit protection, there is a decreased efficiency at light loads, because the base current value is set at a high value so that at a maximum load there is enough current to saturate the transistors of the oscillator. In the current feedback arrangement of the prior art, on the other hand, the oscillator circuit employs base current which is proportional to the load and not the supply voltage. Therefore, it operates much the same as the voltage feedback type circuit, but it is not short circuit proof.

In the field of regulated DC/DC converters, prior art techniques for power conversion usually employ a form of pulsed waveform averaging. The two fundamental circuits are the well-known chopper and fly-back circuits. In the chopper circuit, the duty cycle cannot exceed 1.0 and therefore this circuit can only step the voltage down; whereas, in the fly-back circuit, the output voltage is equal to the input voltage divided by the switch-off duty cycle and therefore this circuit can only step the voltage up.

SUMMARY OF THE INVENTION

The present invention employs a new principle of operation which has been developed to achieve efficient regulation and conversion without requiring large filters for smoothing the waveforms. More specifically, the present invention employs a modification of the standard pulse width modulation technique in which two square waves of equal amplitude and different phase are normally added together to produce a resultant waveform having an average value that can be varied from one voltage value to another by varying the phase difference between 0° and 180°. However, in the proposed converter of the present invention, the square waves that are added together are of unequal amplitude (e.g., one being 20 percent of the amplitude of the other) such that the resultant waveform, although having a more limited range of average values, is more easily filtered. Regulation against changes in input voltage is then accomplished, in the proposed circuitry, by changing the phase difference between the two square waves to make the average value of the output voltage remain constant. This is accomplished by comparing the output with a reference value and generating an error signal that is proportional to the difference. The error signal is then used in a delay circuit to synchronously delay the phase of the slave oscillator. This proposed technique produces a step width modulated output which can for example, when using a slave output amplitude that is 20 percent of the master output amplitude, compensate for changes of from −17 percent to +25 percent in input voltage about the nominal (the conditions at 90° phase difference).

Although the proposed converter is designed to regulate primarily against changes in input voltage, inasmuch as feedback control is taken from the output, it will also compensate for anything else that ends to change the output voltage level. For example, IR drops in the transformer and changes in the conduction voltage drops in the power transistors and rectifier diodes are also countervailed. Suitable filtering means are used on the outputs in order to obtain the desired average value of the output waveform after rectification.

The step width modulation technique employed in the present invention also produces no more ripple in the resultant output waveform (to the filters) than is absolutely necessary for the desired range of regulation. Conventional pulse width modulation schemes produce around 100 percent ripple, which actually means larger, heavier and less responsive filters. An L-C filter with a large value of inductance will also produce larger voltage transients if the load current is abruptly changed. Another determinant for a minimum size inductor is the fact that the filter elements will average the voltage applied to them only if the current in the inductor is continuous.

In view of the above discussion, it is therefore an object of the present invention to provide a new and improved DC/DC converter employing step width modulation.

A further object of the invention is to provide a regulated DC/DC converter that utilizes a dual core transformer wherein the primary of one core is fed by a first oscillator and the primary of the other core is fed by a second oscillator whose output amplitude is a predetermined fraction of the first oscillator's output amplitude and wherein the resultant output voltage level across the secondary of said transformer can be varied by adjusting the phase relationship between said first and second oscillators.

Another object of the invention is to provide a converter that is relatively compact and light weight.

An additional object of the invention is to provide a DC/DC converter with a filter stage that does not require large inductors.

Another object of the invention is to provide a converter with an improved voltage transient response.

A still further object of the invention is to provide a step width regulated DC/DC converter that operates with high efficiency.

Another object of the present invention is to provide a power converter that exhibits low ripple generation.

It is yet another object of the invention to provide a DC/DC converter that contains inherent short circuit and overload protection.

Figure 2:
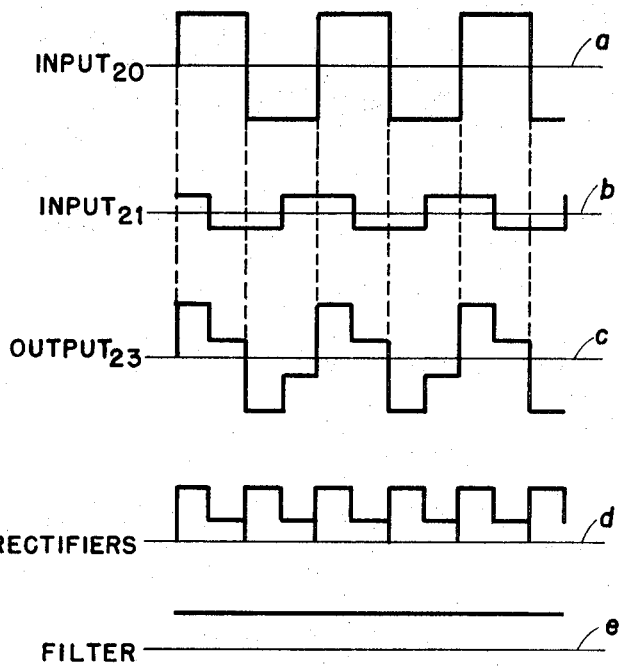
Figure 3:
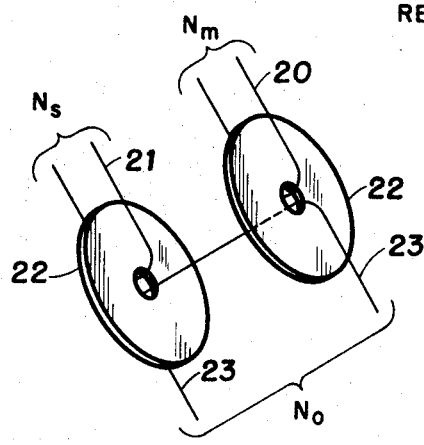

Other object, functions and characteristic features of the instant invention will become more apparent as the description of the subject invention proceeds and will in part be obvious from the drawings, wherein:

FIG. 1 is a simplified block diagram of the preferred embodiment of the subject invention;

FIG. 2 denotes the various waveforms that are generated in the preferred embodiment of the present invention;

FIG. 3 illustrates a dual-core transformer utilized in the present invention; and FIG. 4a and 4b constitute a detailed schematic diagram of the preferred embodiment of the subject invention.

Referring now to FIG. 1, a high power master oscillator 10 is used to supply unregulated power to the loads 11. A smaller, triggered slave oscillator 12 is frequency locked out of phase to the power oscillator 10, and its output voltage is summed with that of the master 10. The output voltage of the slave 12 is only a small percentage of the master's output, and therefore only modifies its amplitude. The effect is to add a step to the output voltage waveform. The width of the step can be modulated by varying the phase relationship of the oscillators. Thus, while the slave 12 cannot completely buck the output of the master 10, it can reduce or increase it by a sufficient amount to achieve regulation. The range of input voltages over which this circuit can operate may be adjusted to accommodate various needs. The master and slave oscillators 10 and 12 are free-running DC-to-DC converters.

The master oscillator 10 is designed such that it would, at a nominal input voltage, supply just the right amount of flux to the transformer 13 to yield the desired output voltages with no net flux contributed by the slave oscillator. At a phase delay of 90°, the slave oscillator 12 adds and subtracts the same amount of flux and therefore yields no net flux. The master oscillator 10, which oscillates at a relatively constant frequency, provides a synchronizing signal 14 to a delay circuit 15 which, in turn, delays the signal the appropriate amount of time to give the needed phase delay. This delayed signal 16 is then used to trigger the slave oscillator 12. Thus, the slave oscillator is forced to flip or flop a certain amount of time after the master oscillator has flipped or flopped. The amount of delay time is controlled by a reference and error amplifier 17. The delay circuit 15 utilized in the preferred embodiment is similar to a magnetic amplifier. The reference and error amplifier 17 is a standard differential comparator. Rectifying and filtering elements 18 are connected to the secondary winding of transformer 13 and may, for example, be standard high speed silicon rectifiers and L-C tank filters respectively. One of the output lines which has a relatively constant load is normally chosen as a feedback line 19 for the error detector and amplifier 17.

FIG. 2 illustrates the waveforms that are generated in the various circuits of FIG. 1. In FIG. 2, waveform a, the standard square wave pulse is generated from the master oscillator 10 and applied to one primary 20 of the summing transformer 13. Likewise from the slave oscillator 12 there is shown in FIG. 2, waveform b, a square wave pulse similar to the output of said master oscillator 10 but of a different phase and lesser amplitude which, in turn, is also applied to other primary 21 of said transformer 13. Waveform c of FIG. 2 illustrates the resultant output waveform that is obtained from the summing of the two input waveforms applied to primaries 20 and 21. This waveform is identified as a step width modulated waveform. FIG. 2, waveform d, denotes the waveform after rectification by the high speed silicon rectifiers contained within rectifier and filter network 18; whereas, waveform e illustrates the constant level DC voltage that appears after filtering.

Normally the summing of the output voltages, as illustrated in FIG. 2, utilizes two transformers. However, this can be accomplished in one specially made dual-core transformer as depicted in FIG. 3. The power transformer 13 is a flux summing transformer in which the output voltage is the algebraic sum of the two input voltages. That is, the primaries 20 and 21 of the transformer are connected to the master and slave oscillators 10 and 12 respectively and are wound on separate cores 22, with the slave primary winding 21 having a predetermined number of turns greater than that of the master primary winding 20 (e.g., five times the number of turns for 20 percent amplitude). The secondary winding 23, is then wound through both cores simultaneously so that the secondary 23 is influenced by the sum of the fluxes in the two cores 22.

Referring now to FIG. 4b, the master oscillator 10 is in the form of a standard DC-to-AC converter. However, it utilizes paralleled power transistors 24, 25, 26, 27 to get a lower saturated voltage drop. The voltages at the collectors of the power transistors 24 through 27 are alternately maximum and minimum for a given voltage supply. These voltages are applied to primary winding 20 of transformer 13 and are also used as synchronizing signals for the slave oscillator 12.

As previously mentioned, this converter gives benefits of short circuit protection and high efficiency due to optimum drive to its power transistors 24 through 27, during switching. That is, a transistor pair 24–25 is turned on by magnetic kickback (due to the collapse of voltage across the transformer 20) after the other transistor pair 26–27 has turned off, and vice versa is maintained on by current limited positive feedback (via transformer 56), and then is turned off by a low impedance reversed bias which is due to the saturation of transformer 56. This circuit assures that both transistor pairs cannot be on at the same time, as can happen in a driven circuit due to storage time or delay time overlap.

In FIG. 4a, it can be seen that the slave oscillator 12 includes power transistors 30 and 31 and is similar to the master oscillator 10 except that it has no self-starting circuit (diode 58 and resistor 57 of master oscillator 10) since none is needed. By way of example, these power transistors might be Bendix silicon planar power transistors, B-3728. The Zener diodes 28, 29 serve a dual purpose, that is, they clip voltage spikes generated when the slave oscillator 12 switches and they also conduct in their normal forward diode direction when the slave oscillator is bucking the flux in transformer 13 produced by the main oscillator 10. In this state, the slave oscillator is in the unusual position of having to accept power from, rather than supply power to, the transformer 13. During this time one of the power transistors 30 or 31 of the slave oscillator is operating in the inverse mode. But, due to its low inverse beta, its collector-to-emitter saturation voltage is high, causing the Zener diode 28 or 29 to conduct in its forward direction. The slave oscillator 12 has a natural operating frequency somewhat lower than the master oscillator 10 and can thus be frequency locked to it properly. During the cycle, when the master and slave oscillators are in phase, that is, when the slave's output is adding to the master's to provide a boost, the slave oscillator 12 operates in a normal fashion. A few microseconds later, the slave 12 changes polarity and is then out of phase with the master 10, thereby bucking some of its output. For example, in the preferred embodiment the slave oscillator amplitude is 20 percent of that of the master oscillator; then, when the phase difference between them is set at some value between 0° and 180°, the output voltage will have an average value which is between 120 percent and 8 percent nominal. Since it is desired that the output voltage be fixed against changes in the supply voltage, it can be noted that as much as 120 percent of the lowest supply voltage and as little as 80 percent of the highest is obtained. This allows for a supply voltage variation of from −16.7 percent to +25 percent about nominal. By the appropriate juggling of this nominal condition (the condition at 90° phase difference), a supply of voltage variation of about ±20 percent (i.e., when the slave's amplitude equals 20 percent of the amplitude of the master oscillator) can be arranged.

A unique method of triggering is employed in the slave oscillator 12 which simulates the normal action of the Jensen oscillator. The method of triggering used is to short out the feedback transformer 56 in one direction so that saturation of the transformer core is simulated as occurs in a normal Jensen oscillator of which master oscillator 10 is an example.

The reference and error amplifier 17, as shown in detail in FIG. 4a, includes a well-known differential amplifier circuit to generate a pair of currents 32 proportional to the error in the output voltage. These currents reset saturable reactors 34 and 35 in the delay circuit 15. Maximum delay provided by delay circuit 15 corresponds to maximum currents 32 which in turn corresponds to minimum supply of voltage in reference and error amplifier 17.

The outputs 32 of the reference and error amplifier 17 and also the synchronizing voltages 14 of the master oscillator 10 are fed to the delay circuit 15. This delay circuit 15 is similar to a magnetic amplifier in that saturable reactors 34, 35 are used to delay the application of power to their loads. The amount of delay depends on the degree to which their flux has then reset during the control half cycle. For example, when the master oscillator transistors 26 and 27 are saturated, diode 36 of the delay circuit 15 is back biased. Current source transistor 37 then resets delay reactor 34 a certain amount of volt seconds away from positive saturation. Then in the next half cycle, with transistors 26 and 27 off, the voltage from the master oscillator 10 overpowers the control current in delay reactor 34 and drives said delay reactor back to positive saturation. Transistors 38 and 39 buffer the output of the delay circuit 15 and provide the optimum switching action for the slave oscillator 12. When delay reactor 34 saturates, transistor 38 is driven into saturation shorting out the feedback voltage in transformer 59 in one direction, thus forcing the slave oscillator 12 to flip to to the opposite state. Diodes 36 and 40 decouple the reactors 34 and 35 from the sync lines 14 during reset intervals to allow currents from the feedback amplifier 17 to reset the cores of the saturable reactors 34 and 35. Hash filters 41 and 42 are used to filter out interwinding capacitance spikes in the delay reactors 34 and 35. The level sensing networks which consist of resistors 43, 44, 45, 46, and diodes 47 and 48 sense the change from magnetizing current to saturated current in the reactors 34 and 35 and turn the short-out transistors 38 and 39 on at the right time. Diodes 49 and 50 decouple the short-out transistors 38 and 39 from the short-out windings 60 when the slave oscillator transformer 59 polarity reverses, for otherwise it could not complete the reversal but would remain off. This property of an unidirectional short circuit is an exact stimulation of a saturated core.

The output waveforms from the transformer 13 of FIG. 4b are rectified with high speed silicon rectifiers 51 and then filtered in L-section filters each of which comprises an inductor 52 connected to the output of one of the rectifiers 51 and further comprising a capacitor 53 connected to ground in electrical parallelism with said inductor 52. One of the output lines 19 which has a relatively constant load is normally chosen as a sample point for the error detector and amplifier 17 of FIG. 4a. The L-section filters 52-53 were chosen with a critical inductance based upon 10 percent of the nominal load. Then when any load current is greater than 10 percent of nominal, the associated filter will average the step width modulated waveform and provide the correct output voltage. Below 10 percent of nominal load current, the associated rectifier and filter will begin to peak detect and the voltage output can rise as much as 40 percent above nominal. Therefore, for the protection of user packages at very light loads, each output is given a minimum load as represented by Zener diode 54 and a series resistor 55. The resonant frequency of the sensed line 19 is purposely much lower than that of the other lines to provide stability for the feedback loop. The reason for this is that the master oscillator's frequency and output voltage are somewhat load sensitive. Thus, the regulation loop has a compensate for changes in load. The gain of the feedback loop is rolled off considerably at frequencies where the other filters would ring when a step load change is applied.

I claim:

1. A DC/DC step width modulated voltage regulator comprising:
    a source of first periodically varying signals;
    a source of second periodically varying signals;
    means for combining said first periodically varying signals and said second periodically varying signal to produce a resultant periodically varying signal;
    converting means for rectifying and filtering said resultant periodically varying signal to produce a DC voltage level output;
    a source of reference voltage;
    means to compare said reference voltage with said DC output voltage to produce an error signal; and
    means responsive to said error signal for adjusting the phase relationship between said first and said second periodically varying signals, said phase adjusting means being a delay circuit comprising:
    first and second delay reactors respectively connected to the outputs of said error signal producing means and said source of first periodically varying signals, and
    a level sensing means connected to the output of each of first and second delay reactors, said level sensing means sensing the change from magnetizing current to saturated current in each of said first and second delay reactors,
    means connected to the output of said level sensing means for short circuiting said second source of periodically varying signals, whereby the output of said delay circuit is a trigger signal to said second source of periodically varying signals effective to control the phase relationship between said sources of first and second periodically varying signals.

2. The regulator as claimed in claim 1 wherein said short-circuiting means is a pair of short circuit transistors.

3. The regulator as recited in claim 1 wherein said level sensing means comprises:
    first and second resistors serially connected to the outputs of said first and second delay reactors; and
    a pair of tunnel diodes connected between said resistors.

4. The regulator as claimed in claim 1 wherein said error signal producing means generates a pair of error signals effective to reset said first and second delay reactors.

5. The regulator as claimed in claim 1 wherein said source of said first periodically varying signals is a master oscillator and wherein said source of said second periodically varying signals is a slave oscillator.

6. The regulator as recited in claim 5 wherein said slave oscillator generates an output signal whose amplitude is a predetermined fraction of the output signal amplitude of said master oscillator.

7. The regulator as recited in claim 1 wherein said means for combining said first and second periodically varying signals is a dual-core transformer comprising:
    first and second primary windings, each winding being wound about separate and distinct core members and connected respectively to the outputs of said master and slave oscillators; and
    a common secondary winding wound about both of said first and second core members.

8. The regulator as claimed in claim 7 wherein the ratio of the number of turns in the primary windings for said slave core to the number of turns in the primary winding for said master core is equal to the reciprocal of the fractional relationship between the respective output signal amplitudes from said slave and master oscillators.

9. The regulator as claimed in claim 7 wherein said secondary winding of said dual-core transformer is connected to a plurality of output taps and wherein said converting means comprises:
    rectifying means serially connected to each of said secondary winding output taps;
    inductor means having one terminal serially connected to the output of said rectifying means;
    capacitance means connected between the other terminal of said inductor means and ground; and
    means connected in parallel with said capacitance means to suppress the buildup of excessive voltage across said capacitance means, said voltage suppression means comprising serially connected resistor and diode.